US012181105B2

(12) United States Patent
Li et al.

(10) Patent No.: US 12,181,105 B2
(45) Date of Patent: Dec. 31, 2024

(54) PROCESSING APPARATUS, CORRUGATED PLATE, AND STORAGE CONTAINER

(71) Applicants: SINOTECH ENERGY CO., LTD., Shanghai (CN); SINOPEC ENGINEERING INCORPORATION, Beijing (CN)

(72) Inventors: Fengqi Li, Beijing (CN); Jian Zhang, Beijing (CN); Ying Wei, Shanghai (CN); Xiangao Feng, Shanghai (CN); Wei He, Shanghai (CN); Kang Wang, Shanghai (CN); Qingfeng Yin, Beijing (CN); Ming Li, Beijing (CN); Hao Wu, Beijing (CN)

(73) Assignees: SINOTECH ENERGY CO., LTD., Shanghai (CN); SINOPEC ENGINEERING INCORPORATION, Beijing (CN)

( * ) Notice: Subject to any disclaimer, the term of this patent is extended or adjusted under 35 U.S.C. 154(b) by 0 days.

(21) Appl. No.: 18/430,494

(22) Filed: Feb. 1, 2024

(65) Prior Publication Data

US 2024/0167626 A1 May 23, 2024

(30) Foreign Application Priority Data

Jun. 26, 2023 (CN) ......................... 202310755823.4

(51) Int. Cl.
*B21D 13/10* (2006.01)
*F17C 3/00* (2006.01)

(52) U.S. Cl.
CPC ........ *F17C 3/00* (2013.01); *F17C 2201/0147* (2013.01); *F17C 2209/21* (2013.01);
(Continued)

(58) Field of Classification Search
CPC ........ B21D 5/16; B21D 11/206; B21D 13/02; B21D 13/10; B21D 51/12; F17C 3/00
See application file for complete search history.

(56) References Cited

U.S. PATENT DOCUMENTS

| | | | | | |
|---|---|---|---|---|---|
| 4,635,462 | A * | 1/1987 | Bald | ...................... | B21D 13/02 72/414 |
| 10,335,844 | B2 * | 7/2019 | Perrot | ...................... | B21D 3/00 |

(Continued)

FOREIGN PATENT DOCUMENTS

| | | | |
|---|---|---|---|
| CN | 2794685 | Y | 7/2006 |
| CN | 205270589 | U | 6/2016 |

(Continued)

OTHER PUBLICATIONS

KR 100762083B1, Choe et al. Oct. 2007.*
Translation CN 205270589U, Li Jun. 2016.*
Translation CN 110405028A, Perrot et al. Nov. 2019.*

*Primary Examiner* — Edward T Tolan

(57) ABSTRACT

Disclosed are a processing apparatus, a corrugated plate, and a storage container. The processing apparatus includes a pair of slide plates, a pair of press plates, a shaping block, and a driving mechanism. The driving mechanism includes a slide plate driving portion linked to a shaping block driving portion, allowing the slide plate driving portion drives the pair of slide plates to approach each other at a first predetermined speed, the shaping block driving portion moves the shaping block downward at a second predetermined speed, and the first and second predetermined speed are specifically correlated with respect to a predetermined forming profile of an intersection portion. The processing apparatus of the present disclosure causes running speeds of various portions that move in different directions to extrude a blank plate to be specifically associated, so that the formation process is
(Continued)

particularly applicable to a corrugated plate having the predetermined corrugated shape.

16 Claims, 8 Drawing Sheets

(52) U.S. Cl.
CPC ... *F17C 2209/232* (2013.01); *F17C 2221/011* (2013.01); *F17C 2221/012* (2013.01); *F17C 2221/014* (2013.01); *F17C 2221/017* (2013.01); *F17C 2221/033* (2013.01); *F17C 2223/0161* (2013.01); *F17C 2260/01* (2013.01); *F17C 2270/0107* (2013.01); *F17C 2270/0134* (2013.01)

(56) References Cited

U.S. PATENT DOCUMENTS

| | | | | |
|---|---|---|---|---|
| 10,688,549 | B2 * | 6/2020 | Perrot | B21D 13/10 |
| 10,946,426 | B2 * | 3/2021 | Perrot | B21D 11/10 |
| 2005/0082297 | A1 | 4/2005 | Dhellemmes | |
| 2013/0019650 | A1 * | 1/2013 | Rogers | B21D 5/0209<br>29/428 |
| 2017/0066027 | A1 | 3/2017 | Perrot et al. | |

FOREIGN PATENT DOCUMENTS

| | | | |
|---|---|---|---|
| CN | 106457335 | A | 2/2017 |
| CN | 107913928 | A | 4/2018 |
| CN | 108290195 | A | 7/2018 |
| CN | 109482725 | A | 3/2019 |
| CN | 110405028 | A | 11/2019 |
| CN | 215745915 | U | 2/2022 |
| CN | 115179344 | A | 10/2022 |
| CN | 115846480 | A | 3/2023 |
| KR | 20120104461 | A | 9/2012 |
| SU | 1759501 | A1 | 9/1992 |
| WO | 2017077214 | A1 | 5/2017 |
| WO | 2018065685 | A1 | 4/2018 |

* cited by examiner

PROCESSING APPARATUS, CORRUGATED PLATE, AND STORAGE CONTAINER

CROSS-REFERENCE TO RELATED APPLICATIONS

This application claims the benefit of priority from Chinese Patent Application No. 202310755823.4, filed on Jun. 26, 2023. The content of the aforementioned application, including any intervening amendments thereto, is incorporated herein by reference in its entirety.

TECHNICAL FIELD

The present disclosure relates to the field of liquefied gas storage tanks for marine engineering equipment, particularly marine equipment such as ships, and particularly to a processing apparatus for a corrugated plate of a liquefied gas storage tank for a transport device, particularly marine equipment such as ships, a corrugated plate, and a storage container including the corrugated plate. The storage container particularly includes the liquefied gas storage tanks for marine equipment such as ships. Liquefied gases include, for example, liquefied natural gas, liquid nitrogen, liquid oxygen, liquid hydrogen, and liquid helium, etc.

BACKGROUND

Liquefied natural gas (LNG) constantly serves as first-choice energy to substitute for petroleum due to its advantages of greenness, environment friendliness, and high efficiency, and becomes one of the fastest growing energy industries in the world. With the rapid development of China's economy and the continuous improvement of environmental governance requirements, the application and development of LNG have attracted more and more attentions. LNG is one of the critical directions for the future development of clean energy in China.

Transportation of LNG typically relies on transport devices, e.g., marine equipment such as ships. The composition of an LNG receiving station mainly includes wharf unloading, LNG storage, process treatment, and external transportation. An LNG storage tank undertaking a storage task has the longest construction period, the most advanced technology, and the most difficulties in a project construction process, and is always managed as a critical path of the entire project. Moreover, the construction form and technological innovation of the LNG storage tank are also the focus of attention from Chinese and international professionals in the industry.

In the LNG storage tank, a corrugated plate for constituting a sealing layer needs to be able to maintain good sealability and stability under various conditions of use. Therefore, the configuration and quality of the corrugated plate are especially important, and thus, the requirements for a process of producing and manufacturing the corrugated plate are also higher. In an existing process for manufacturing a corrugated plate, corrugations are manufactured by simple bending and punching dies. The material uniformity, fluency, and strength of the corrugated plate manufactured in this way all need to be improved at the corrugations, particularly at intersections of transverse and longitudinal corrugations.

Therefore, there is a need to provide a processing apparatus, a corrugated plate, and a storage container to at least partially solve the above problems.

SUMMARY

The present disclosure aims to provide a processing apparatus. A driving mechanism of the processing apparatus is uniquely configured for a predetermined formed corrugated shape to particularly cause running speeds of various portions that move in different directions to extrude a blank plate to be specifically associated, so that the formation process is particularly applicable to a corrugated plate having the predetermined corrugated shape. The corrugated plate manufactured in such process will have better material uniformity, fluency, and strength at its formed corrugations, particularly at intersections of transverse and longitudinal corrugations.

The present disclosure further provides a corrugated plate and a storage container having the corrugated plate, for example, a storage container for storing LNG. A sealing layer of the storage container is manufactured by the processing apparatus provided by the present disclosure.

According to one aspect of the present disclosure, a processing apparatus for manufacturing a corrugated plate is provided. The corrugated plate has longitudinal corrugations and transverse corrugations that have an intersection portion. The processing apparatus includes:

- a pair of slide plates movable away from and close to each other along a transverse direction;
- a pair of press plates correspondingly located on top sides of the pair of slide plates to press a blank plate between the pair of slide plates and the pair of press plates tightly;
- a shaping block located between the pair of slide plates, a bottom end of the shaping block having a predetermined forming profile with a transverse size gradually reduced towards a bottom side; and
- a driving mechanism including:
- a slide plate driving portion in contact with the pair of slide plates; and
- a shaping block driving portion connected with the shaping block.

The shaping block driving portion and the slide plate driving portion are fixed relative to each other, so that the slide plate driving portion drives the pair of slide plates to approach each other at a first predetermined speed, the shaping block driving portion drives the shaping block to move downward at a second predetermined speed, and the first predetermined speed and the second predetermined speed are specifically correlated with respect to a predetermined forming profile of the intersection portion. The first predetermined speed is a non-uniform speed, and the second predetermined speed is a uniform speed.

In an implementation, the pair of slide plates each has a force pin protruding longitudinally and having a smooth external profile, and an involute face for getting contact with the force pin is formed on the slide plate driving portion. The involute face is designed to cause the first predetermined speed and the second predetermined speed to be specifically correlated.

In an implementation, the involute face includes a first inclined face, a straight wall face, and a second inclined face from top to bottom, wherein the first inclined face and the second inclined face form an obtuse angle with a vertical line, and the straight wall face is parallel to the vertical line.

In an implementation, the first inclined face transitions to the straight wall face smoothly and has an extension length greater than that of the second inclined face, and a non-slip driving feature structure is disposed on the first inclined face, wherein an included angle of the first inclined face relative to the straight wall face and the extension length of the first inclined face are designed to cause the first predetermined speed and the second predetermined speed to be specifically correlated.

In an implementation, the driving mechanism includes a main horizontal plate and a vertical plate that are connected in one piece, and the vertical plate extends downward from a center of the main horizontal plate in the transverse direction, wherein the slide plate driving portion includes driving rods, tops of which are fixed on the main horizontal plate, and the shaping block is fixed at a bottom end of the vertical plate.

In an implementation, a connection mechanism is disposed between the driving mechanism and the pair of press plates. The connection mechanism is constructed to allow not only the pair of press plates to move vertically together with the driving mechanism, but also the driving mechanism to move vertically relative to the pair of press plates when the pair of press plates are abutted against the top sides of the pair of slide plates.

In an implementation, the driving mechanism includes a main horizontal plate, and the connection mechanism includes pressure source nitrogen gas springs are disposed between the main horizontal plate and the pair of press plates. The pressure source nitrogen gas springs are constructed to be in a free state so that the main horizontal plate moves vertically under a thrust force of the nitrogen gas springs, and to be locked when they are at a maximum tensile length so as to allow the pair of press plates to move vertically together with the main horizontal plate.

In an implementation, the driving mechanism further includes intermediate horizontal plates connected with the main horizontal plate fixedly and located below the main horizontal plate, top ends of the pressure source nitrogen gas springs are fixed on the intermediate horizontal plates, and bottom ends of the pressure source nitrogen gas springs are fixed on the pair of press plates. Moreover, the connection mechanism further includes guide connection limit rods, bottom ends of the guide connection limit rods are fixed on the press plates, the guide connection limit rods penetrate through the intermediate horizontal plates movably, and top ends of the guide connection limit rods are provided with limit portions that can be abutted against top sides of the intermediate horizontal plates.

In an implementation, the top ends of the guide connection limit rods are abutted against a bottom side of the main horizontal plate when the pressure source nitrogen gas springs are shortened.

In an implementation, the processing apparatus further includes a shaping base, which is located below the shaping block and a top surface of which has a forming profile recessed downward, and the shaping base moves downward together when the shaping block moves downward.

In an implementation, the shaping block includes a longitudinal corrugation shaping block extending along a longitudinal direction and an intersection portion shaping block located at a center of the longitudinal corrugation shaping block longitudinally. Only a transverse size of the longitudinal corrugation shaping block is gradually reduced in a direction towards the bottom side, and both a transverse size and a longitudinal size of the intersection portion shaping block are gradually reduced in the direction towards the bottom side, wherein a diversion core having a predetermined punch shape is installed on the intersection portion shaping block, and a hardness of the diversion core is greater than that of other portions of the shaping block.

In an implementation, the intersection portion shaping block includes a smooth bottom surface having four corners that are symmetrical pairwise both longitudinally and transversely, and the intersection portion shaping block further includes four drawbeads extending upward from the four corners respectively, wherein an overall extension direction of each of the drawbeads intersects all of the transverse direction, the longitudinal direction, and a vertical direction.

In an implementation, the bottom surface has four smooth profile boundary lines successively connected between the four drawbeads, and all of the four profile boundary lines are recessed towards a center of the bottom surface at their respective intermediate positions.

In an implementation, among the four profile boundary lines, two profile boundary lines located at both ends of the bottom surface longitudinally have a recessed first radius of curvature, and two profile boundary lines located at both ends of the bottom surface transversely have a recessed second radius of curvature, wherein the first radius of curvature is greater than or equal to the second radius of curvature.

In an implementation, a longitudinal size of the bottom surface is less than its transverse size.

In an implementation, the bottom surface transitions to the drawbeads smoothly, and an included angle between any position of the bottom surface and a horizontal plane is less than an included angle between the overall extension direction of the drawbeads and the horizontal plane.

In an implementation, in a direction from a position where each of the drawbeads is connected with the bottom surface to a tail end away from the bottom surface, a thickness of the drawbead gradually decreases.

In an implementation, in a bottom view of the intersection portion shaping block, a main body portion of each of the drawbeads extends along a direction that intersects both the longitudinal direction and the transverse direction, the tail end of each of the drawbeads extends in the transverse direction, and the main body portion transitions to the tail end smoothly.

In an implementation, a bottommost end of a projection of the intersection portion shaping block within a projection plane defined by the vertical direction and the transverse direction is a curved face, and a bottommost end of a projection within a projection plane defined by the vertical direction and the longitudinal direction is a horizontal straight line segment.

According to another aspect of the present disclosure, a corrugated plate is provided. The corrugated plate has longitudinal corrugations and transverse corrugations that have an intersection portion. After the transverse corrugations are formed, the longitudinal corrugations and the intersection portion are formed by processing with the method of any one of the above solutions.

According to yet another aspect of the present disclosure, a storage container for liquefied gas is provided. A wall of the storage container includes a wall base layer and a sealing plate located on an inner side of the wall base layer. The sealing plate is the corrugated plate described above.

In an implementation, the storage container is a liquefied gas storage container for marine equipment or a land-based apparatus for cryogenic frozen liquid.

BRIEF DESCRIPTION OF THE DRAWINGS

For a better understanding of above and other purposes, features, advantages, and functions of the present disclosure, reference may be made to preferable implementations shown in the drawings. The same reference numeral in the drawings denotes the same component. Those skilled in the art should understand that the drawings are intended to schematically illustrate the preferable implementations of the present disclosure, without any limiting effect on the scope of the present disclosure, and various components in the figures are not drawn to scale.

REFERENCE NUMERALS

Figure 1:
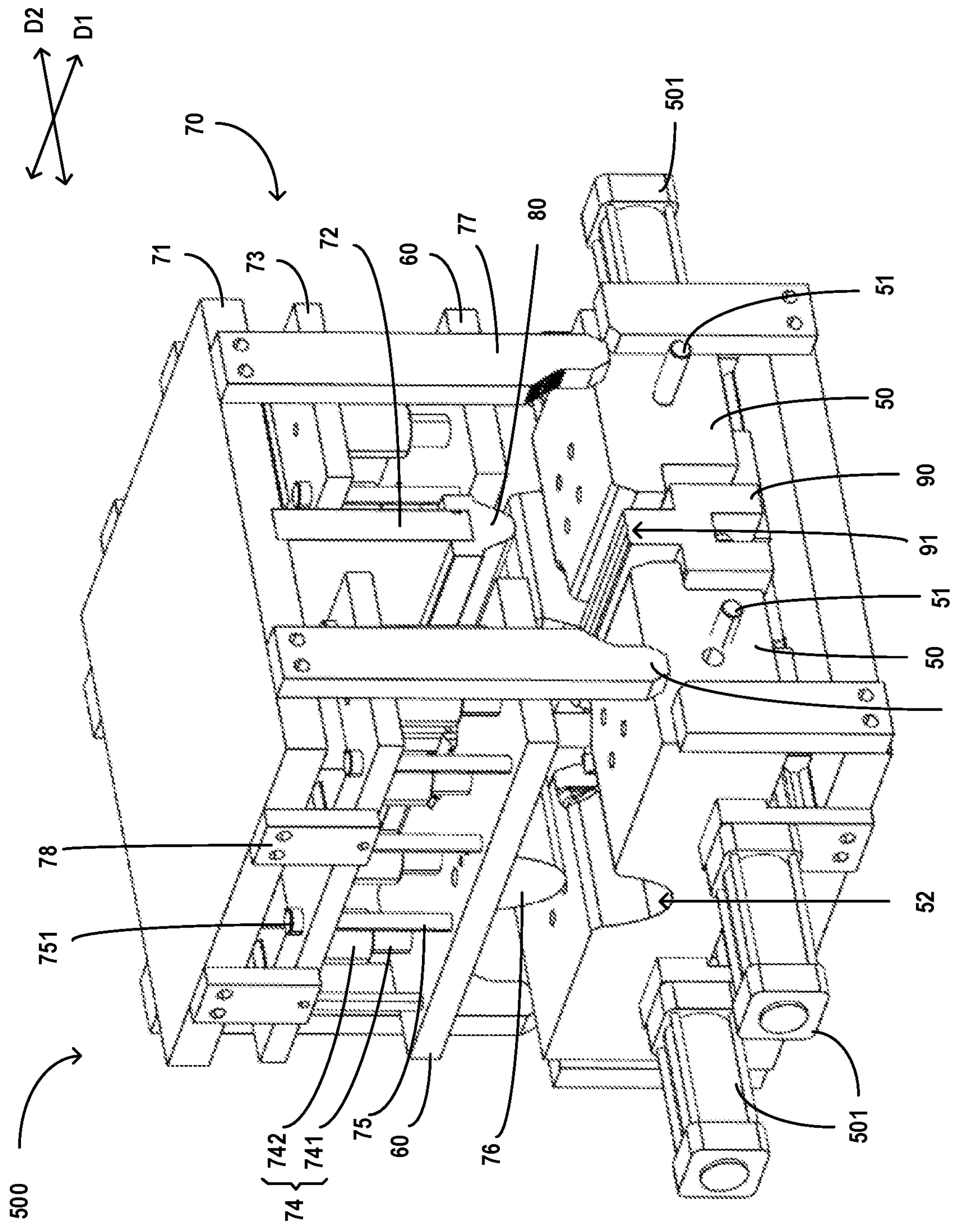
FIG. 1 is a schematic view of a processing apparatus according to some preferable implementations of the present disclosure.

Processing apparatus 500
Air cylinder 501
Slide plate 50
Force pin 51
Accommodating region 52
Press plate 60
Driving mechanism 70
Main horizontal plate 71
Vertical plate 72
Intermediate horizontal plate 73
Pressure source nitrogen gas spring 74
Inner tube 741
Outer tube 742
Guide connection limit rod 75
Limit portion 751
Protrusion portion 76
Driving rod 77
First inclined face 771
Straight wall face 772
Second inclined face 773
Connection section 78
Shaping block 80
Longitudinal corrugation shaping block 81
Intersection portion shaping block 82
Bottom surface 821
Profile boundary lines 8211, 8212 of the bottom surface
Drawbead 822
Region 8221 where the drawbead intersects the bottom surface
Tail end 8222 of the drawbead
Shaping base 90
Forming profile 91.

DETAILED DESCRIPTION

The particular implementations of the present disclosure are described now in detail with reference to the drawings. Only preferable implementations of the present disclosure are described here, and those skilled in the art could conceive of other ways to implement the present disclosure based on the preferable implementations, which also fall within the scope of the present disclosure.

The present disclosure provides a processing apparatus for a corrugated plate of a liquefied gas storage tank for a transport device, particularly marine equipment such as ships, a corrugated plate manufactured by the apparatus, and a storage container having the corrugated plate. The storage container, for example, is one for storing LNG. The storage container may be a liquefied gas storage container for marine equipment or a land-based apparatus for cryogenic frozen liquid. FIGS. 1-6 show schematic views of a processing apparatus according to a preferable implementation of the present disclosure.

It should be noted first that directional and positional terms as mentioned in the present disclosure are only illustrative descriptions rather than limiting descriptions. The description about a position of a component should be understood as a relative position rather than an absolute position, and the description about an extension direction of a component should be understood as a relative direction rather than an absolute direction. Directional and positional terms related to the processing apparatus may be understood with reference to positions, directions, etc. of various components shown in FIGS. 1-6. For example, the terms such as "top side", "upward", "bottom side", "downward" and the like for various components of the processing apparatus can be explained with reference to the placement orientation of the processing apparatus shown in FIGS. 1, 5, and 6; "upward" and "downward" directions are along a vertical direction as shown by D3; and a "transverse direction" and a "longitudinal direction" are two horizontal directions perpendicular to each other. The transverse direction is shown by D2, and the longitudinal direction is shown by D1. The vertical direction D3, the transverse direction D2, and the longitudinal direction D1 are orthogonal in space. "Longitudinal corrugations" of the corrugated plate refer to corrugations extending longitudinally, and "transverse corrugations" refer to corrugations extending transversely.

Figure 2:
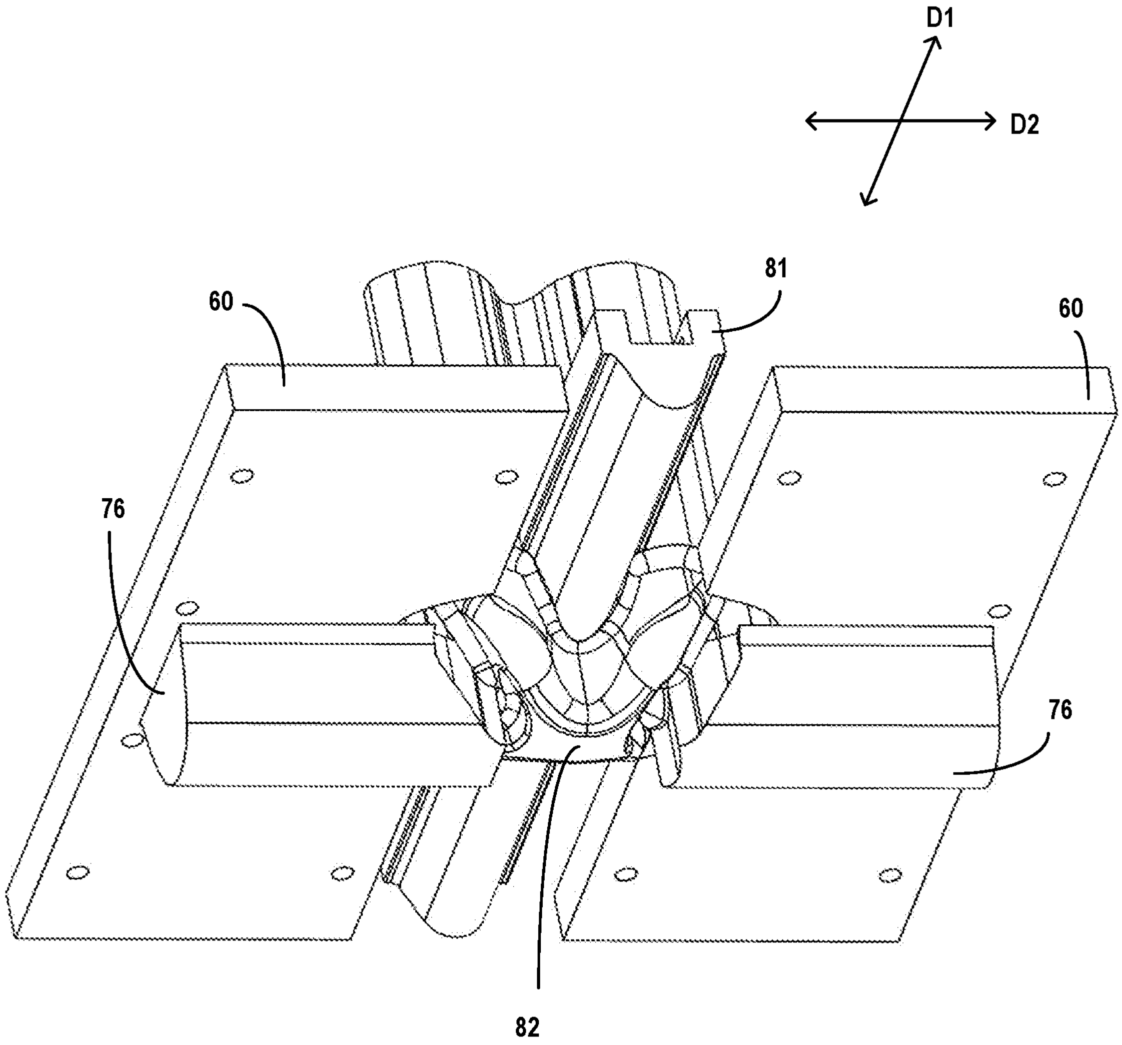
FIG. 2 is a schematic view of a press plate, a shaping block, and other members of the processing apparatus in FIG. 1 from a look-up perspective.

First, referring to FIG. 1, a processing apparatus 500 includes a pair of slide plates 50 arranged side by side transversely, a pair of press plates arranged side by side transversely, a shaping block 80, and a driving mechanism 70. The pair of slide plates 50 are movable away from and close to each other transversely, and the pair of press plates are correspondingly located on top sides of the pair of slide plates 50, so that a corrugated plate may be pressed between the pair of slide plates 50 and the pair of press plates tightly. The shaping block 80 is located between the pair of slide plates 50. The shaping block 80 further includes a longitudinal corrugation shaping block 81 and an intersection portion shaping block 82 as shown in FIG. 2. The driving mechanism 70 includes a slide plate driving portion in contact with the pair of slide plates 50 and a shaping block driving portion connected with the shaping block 80.

The driving mechanism 70 may include a main horizontal plate 71 and a vertical plate 72 that are connected in one piece, and the vertical plate 72 extends downward from a center of the main horizontal plate 71 in a transverse direction. The slide plate driving portion, for example, includes driving rods 77, tops of the driving rods 77 are fixed on the main horizontal plate 71, and the shaping block 80 is fixed at a bottom end of the vertical plate 72. The pair of slide plates 50 each has a force pin 51 protruding longitudinally and having a smooth external profile, and involute faces for getting contact with the force pins 51 are formed on the driving rods 77. When the driving mechanism 70 drives the shaping block 80 to move downward at a uniform speed, different regions of the involute faces of the driving rods 77 contact the slide plates 50, resulting in the slide plates 50 moving at a variable speed as a whole.

It can be understood that in the implementation as shown in FIG. 1, the shaping block driving portion and the slide plate driving portion are fixed relative to each other, the shaping block driving portion is connected with the shaping block 80 fixedly, and the slide plate driving portion drives the slide plates 50 in a manner of frictional contact, so that although both moving speeds and directions of the shaping block driving portion and the slide plate driving portion are consistent, moving speeds and directions of the shaping block 80 and the slide plates 50 are different. Under the action of the driving mechanism 70, the speed of the pair of slide plates 50 approaching cach other transversely is called a first predetermined speed, and the speed of the driving mechanism 70 moving downward is called a second predetermined speed.

In an implementation, press plates 60 of the processing apparatus 500 for pressing above a blank plate may be also driven by the driving mechanism 70 in some cases, so that the press plates 60 can be raised so as to allow an operator to place the blank plate between the press plates 60 and the slide plates 50. For example, in some implementations, a connection mechanism is disposed between the driving mechanism 70 and the pair of press plates 60. The connection mechanism is constructed to allow not only the pair of press plates 60 to move vertically together with the driving mechanism, but also the driving mechanism 70 to move vertically relative to the pair of press plates 60 when the pair of press plates 60 are abutted against the top sides of the pair of slide plates 50.

The driving mechanism 70 may include pressure source nitrogen gas springs 74 disposed between the main horizontal plate 71 and the press plates 60. The pressure source nitrogen gas springs 74 are constructed to be able to be locked when they are at a maximum tensile length so as to allow the pair of press plates 60 to move vertically together with the main horizontal plate 71. In order to ensure that there is no relative displacement in a horizontal direction between the main horizontal plate 71 and the press plates 60 when the main horizontal plate 71 moves relative to the press plates 60, the processing apparatus 500 is further provided with intermediate horizontal plates 73 and guide connection limit rods 75. The intermediate horizontal plates 73 are connected below the main horizontal plate 71 fixedly by connection sections 78, top ends of the pressure source nitrogen gas springs 74 are fixed on the intermediate horizontal plates 73, and bottom ends of the pressure source nitrogen gas springs 74 are fixed on the pair of press plates 60. Bottom ends of the guide connection limit rods 75 are fixed on the press plates 60, the guide connection limit rods 75 penetrate through the intermediate horizontal plates 73 movably, and top ends of the guide connection limit rods 75 are provided with limit portions 751 that can be abutted against top sides of the intermediate horizontal plates 73. The limit portions 751 prevent the intermediate horizontal plates 73 from further moving upward relative to the guide connection limit rods 75. In an implementation, when the pressure source nitrogen gas springs 74 are at a minimum tensile length, the limit portions 751 of the guide connection limit rods 75 are abutted against a bottom side of the main horizontal plate 71.

When the press plates 60 need to be raised, the driving mechanism 70 may be actuated to move upward. In a first stage of a process of upward movement of the driving mechanism 70, the main horizontal plate 71 and the intermediate horizontal plates 73 move upward relative to the press plates 60, the pressure source nitrogen gas springs 74 restore their original lengths between the intermediate horizontal plates 73 and the press plates 60, and the guide connection limit rods 75 penetrate through the intermediate horizontal plates 73 so that the intermediate horizontal plates 73 move upward relative to the guide connection limit rods 75. When the pressure source nitrogen gas springs 74 are stretched to the maximum length while the limit portions 751 of the guide connection limit rods 75 are abutted against the top sides of the intermediate horizontal plates 73, the process of the upward movement of the driving mechanism 70 enters a second stage. In the second stage of the upward movement of the driving mechanism 70, the press plates 60 move upward along with the driving mechanism 70, and the press plates 60 move upward away from the slide plates 50, so that the operator is allowed in this case to place the blank plate between the press plates 60 and the slide plates 50.

When the blank plate has been placed between the press plates 60 and the slide plates 50, the driving mechanism 70 may be actuated to move downward. In a first stage of the downward movement of the driving mechanism 70, stretchable sleeves are at a maximum tensile length, the limit portions 751 of the guide connection limit rods 75 are abutted against top surfaces of the intermediate horizontal plates 73, and the press plates 60 are actuated by the driving mechanism 70 to move downward along with the driving mechanism 70. When the press plates 60 are abutted against top surfaces of the slide plates 50, the process of the downward movement of the driving mechanism 70 enters a second stage. In the second stage, the press plates 60 do not move any more, the driving mechanism 70 moves downward relative to the press plates 60, the pressure source nitrogen gas springs 74 are compressed, and the guide connection limit rods 75 penetrate through and slide relative to the intermediate horizontal plates 73. When the pressure source nitrogen gas springs 74 are at the minimum length (i.e. compressed to the maximum) while the limit portions 751 of the guide connection limit rods 75 are abutted against a bottom surface 821 of the main horizontal plate 71, the second stage ends. It should be noted that the pressure source nitrogen gas springs 74 are installed in an inverted manner. In an installation state, the pressure source nitrogen gas springs 74 have their own tops facing downward and their own bottoms facing upward.

In the second stage of the downward movement of the driving mechanism 70, the shaping block 80 and the slide plates 50 move under the action of the driving mechanism 70 and shape the blank plate. That is to say, the role of the first stage of the downward movement of the driving mechanism 70 is to drive the press plates 60; and the role of the second stage of the downward movement of the driving mechanism 70 is to drive the shaping block 80 and the slide plates 50.

Bottom surfaces 821 of the press plates 60 are provided with protrusion portions 76 corresponding to transverse corrugations on the blank plate, and accommodating regions 52 are disposed at corresponding positions of the slide plates 50. When the processing apparatus 500 processes longitudinal corrugations on the blank plate, the transverse corrugations of the blank plate may be fixed by the protrusion portions 76 and the accommodating regions 52, avoiding deformation of the transverse corrugations.

In other implementations not shown, the press plates 60 and the driving mechanism 70 may have other connection configurations. For example, they may be in a breakable connection configuration so that the driving mechanism and the press plates are not engaged in a first stage of upward movement of the main horizontal plate and engaged after entering a second stage of the upward movement; and the driving mechanism and the press plates are engaged in a first stage of downward movement of the main horizontal plate and disconnected after entering a second stage of the downward movement. Alternatively, the press plates may have an independent driving mechanism, which can be actuated independently of the driving mechanism for the shaping block and the slide plates.

With continued reference to FIG. 1, the processing apparatus 500 is further provided with air cylinders 501 located at two transverse ends of the pair of slide plates 50 pairwise. The air cylinders 501 are configured to pull the pair of slide plates 50 apart before use of the processing apparatus 500 so as to move the pair of slide plates 50 away from each other.

In some implementations, the specific involute faces of the driving rods 77 are configured such that a transverse movement speed (the first predetermined speed) of the pair of slide plates 50 is associated with a downward movement speed (the second predetermined speed) of the shaping block driving portion, and the association relationship is specific to a structural morphology of the shaping block 80. For example, the shaping block 80 shown in FIGS. 2-3 corresponds to the involute face shown in FIG. 4. The involute face shown in FIG. 4 can enable the transverse movement speed (the first predetermined speed) of the pair of slide plates 50 to be associated with the downward movement speed (the second predetermined speed) of the shaping block driving portion, so that the pair of slide plates 50 and the shaping block driving portion work together to obtain longitudinal corrugations and an intersection portion that correspond to the morphology of the shaping block in FIGS. 2-3C. The configuration of the shaping block 80 as well as the involute faces of the driving rods 77 will be discussed below in conjunction with FIGS. 2-3C and 4 respectively.

Referring to FIG. 2, the shaping block 80 includes a longitudinal corrugation shaping block 81 extending longitudinally and an intersection portion shaping block 82 located at a center of the longitudinal corrugation shaping block 81 longitudinally. The longitudinal corrugation shaping block 81 is configured to form the longitudinal corrugations of the corrugated plate on the blank plate, and the intersection portion shaping block 82 is configured to form the intersection portion where the transverse corrugations and the longitudinal corrugations of the corrugated plate intersect on the blank plate. Only a transverse size of the longitudinal corrugation shaping block 81 is gradually reduced in a direction from top to bottom; and both a transverse size and a longitudinal size of the intersection portion shaping block 82 are gradually reduced in a direction from top to bottom. That is to say, in a projection plane defined by the vertical direction and the transverse direction, a projection of the longitudinal corrugation shaping block 81 is formed as a downward bullet-type rough cone; and in both the projection plane defined by the vertical direction and the transverse direction (see FIG. 3B) and a projection plane defined by the vertical direction and the longitudinal direction (see FIG. 3C), a projection of the intersection portion shaping block 82 is formed as a downward bullet-type rough cone. The processing apparatus 500 is further provided with a shaping base 90 (see FIG. 1) located below the longitudinal corrugation shaping block 81. The shaping base 90 is located below the shaping block 80, and a top surface of the shaping base 90 has a forming profile 91 recessed downward. When the shaping block 80 moves downward, the shaping base 90 moves together. In an implementation, a spring is disposed under the shaping base 90. When a mold is opened, the shaping base 90 moves upward under the action of an clastic force of the spring; and when the mold is closed, the shaping block 80 moves downward to push the shaping base 90 to move downward, and the spring is compressed.

Figure 3A:
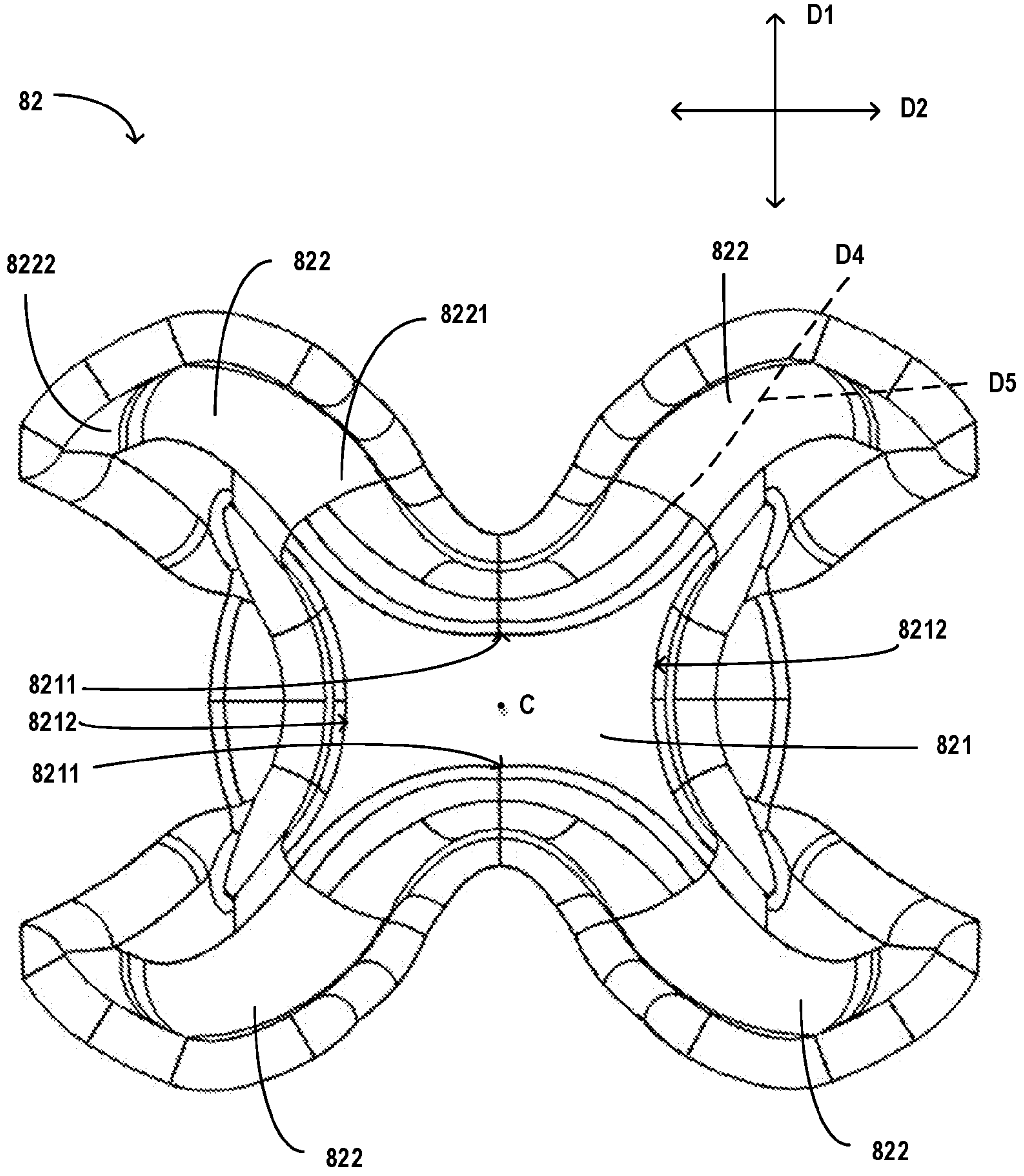
FIG. 3A is a bottom view of an intersection portion shaping block of the shaping block in FIG. 2.
Figure 3B:
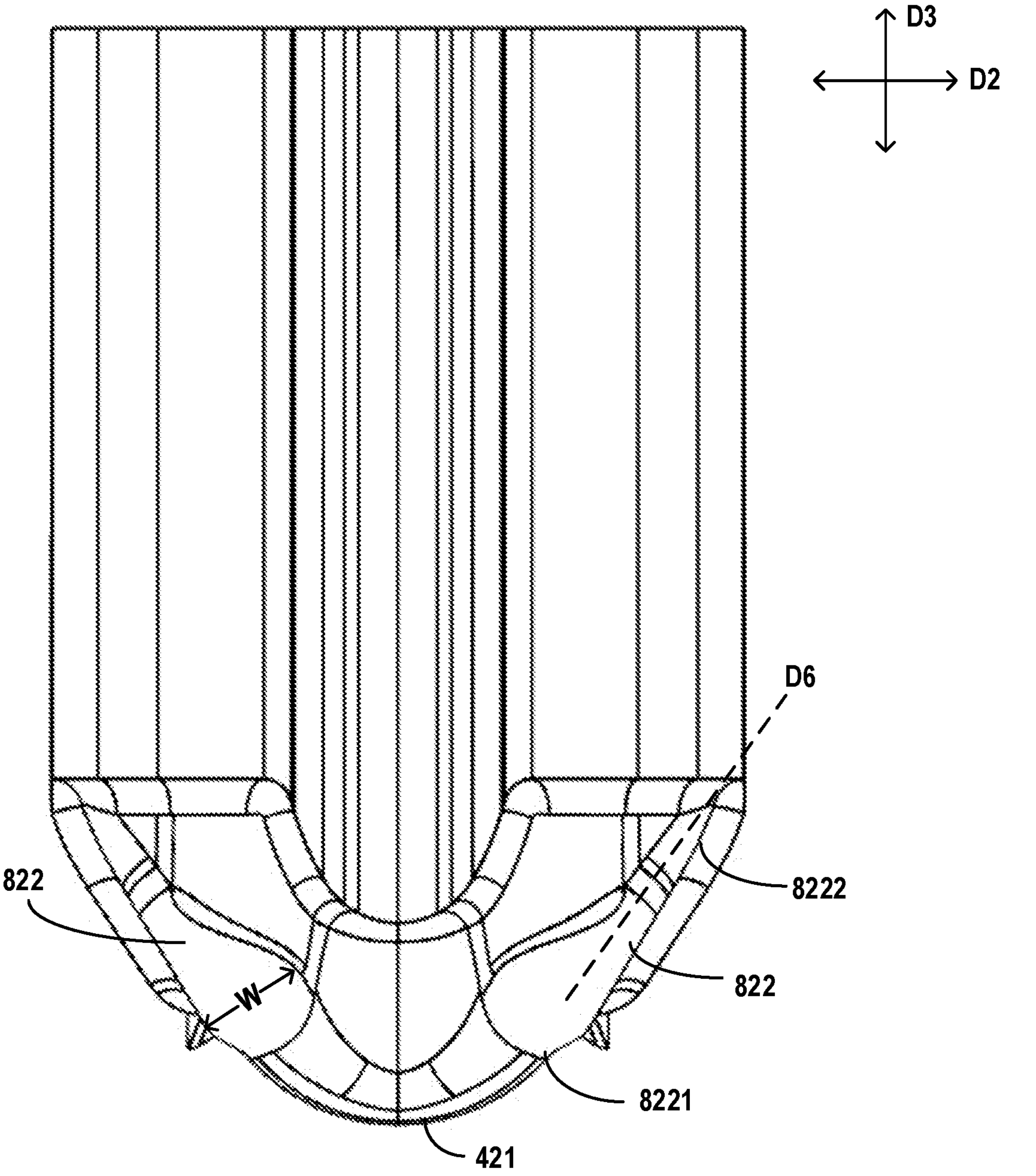
FIGS. 3B and 3C are two side views of the intersection portion shaping block in FIG. 3A respectively.
Figure 3C:
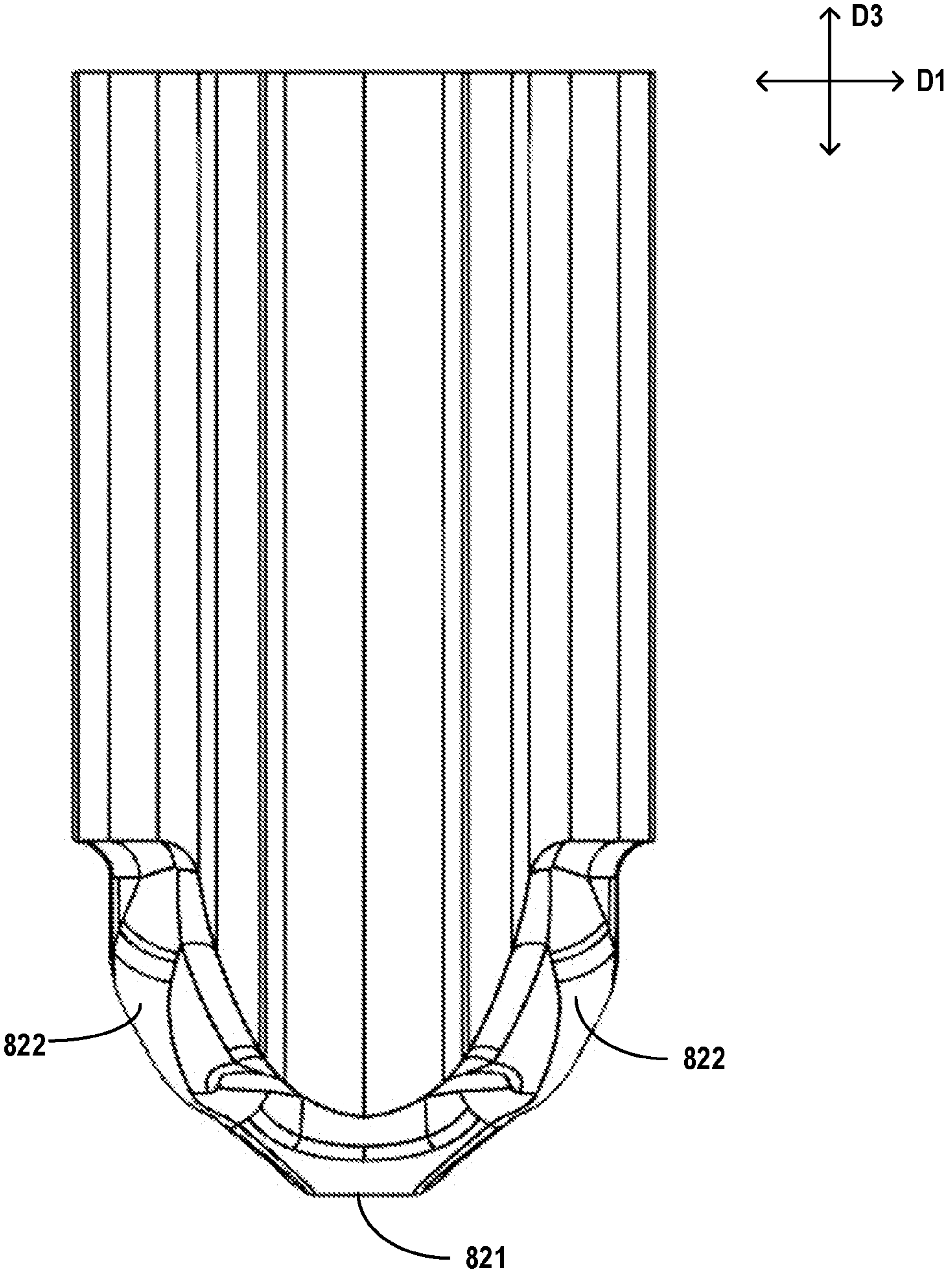

FIGS. 3A-3C show a particular structure of the intersection portion shaping block 82 in detail. FIG. 3A is a top view of the intersection portion shaping block 82, and FIGS. 3B and 3C are two side views of the intersection portion shaping block 82. The intersection portion shaping block 82 includes a roughly smooth bottom surface 821. The smooth bottom surface 821 has four corners that are symmetrical pairwise about a center C of the bottom surface both longitudinally and transversely. Moreover, the intersection portion shaping block 82 further includes four drawbeads 822 extending upward from the four corners respectively. It should be noted that the "smooth bottom surface" means that the bottom surface itself does not have edges or corners.

Referring to FIG. 3A, the bottom surface 821 has four smooth profile boundary lines successively connected between the four drawbeads 822, and all of the four profile boundary lines are recessed towards the center C of the bottom surface 821 at their respective intermediate positions. It can be understood that "recessed" here refers to being recessed within a roughly horizontal plane. In an implementation, among the four profile boundary lines, two profile boundary lines located at both ends of the bottom surface 821 longitudinally have a recessed first radius of curvature, and two profile boundary lines located at both ends of the bottom surface 821 transversely have a recessed second radius of curvature, wherein the first radius of curvature is greater than the second radius of curvature, so that the profile boundary lines 8211 have a gentler radian than the profile boundary lines 8212. Alternatively, the first radius of curvature may be equal to the second radius of curvature. Moreover, the profile boundary lines 8212 have a first length, and the profile boundary lines 8211 have a second length, wherein the first length is less than the second length. It can be understood that such configuration causes a longitudinal size of the bottom surface 821 to be less than its transverse size.

The bottom surface 821 transitions to the drawbeads 822 smoothly. An included angle between any position of the bottom surface 821 and a horizontal plane is less than an included angle between an overall extension direction of the drawbeads 822 and the horizontal plane. That is to say, referring to FIGS. 3B and 3C, the bottom surface 821 is a roughly horizontal arced face, while the drawbeads 822 extend significantly upward. The overall extension direction of each of the drawbeads 822 intersects the transverse direction, the longitudinal direction, and the vertical direction. A component of the overall extension direction of the drawbeads 822 within the horizontal plane is shown by D4 in FIG. 3A; and a component of the overall extension direction of the drawbeads 822 in the plane defined by the transverse direction and the vertical direction is shown by D6 in FIG. 3B.

In a bottom view (FIG. 3A) of the intersection portion shaping block 82, a main body portion of each of the drawbeads 822 extends along a direction that intersects both the longitudinal direction D1 and the transverse direction D2. That is, the direction D4 is neither parallel to the longitudinal direction D1 nor parallel to the transverse direction D2. A component of an extension direction of a tail end 8222 of each of the drawbeads 822 away from the bottom surface 821 in this figure is D5, D5 is parallel to the transverse direction D2, and the main body portion transitions to the tail end smoothly. In an implementation, referring to FIG. 3B, each of the drawbeads 822 has a maximum thickness W at a position 8221 where it is connected with the bottom surface 821. In a direction from the position 8221 where each of the drawbeads 822 is connected with the bottom surface 821 to the tail end 8222 away from the bottom surface 821, a thickness of the drawbead 822 gradually decreases.

In an implementation, a bottommost end of a projection of the intersection portion shaping block 82 within the projection plane defined by the vertical direction D3 and the transverse direction D2 is a curved face (see FIG. 3B), and a bottommost end of a projection within the projection plane defined by the vertical direction D3 and the longitudinal direction D1 is a horizontal straight line segment (see FIG. 3C). That is to say, from the center C of the bottom surface 821, the bottom surface 821 extends smoothly both along the transverse direction D2 and upward, but the bottom surface 821 extends along the longitudinal direction D1 without an upward component. A diversion core having a predetermined punch shape is installed on the intersection portion shaping block 82, and a hardness of the diversion core is greater than that of other portions of the shaping block 80.

Figure 4:
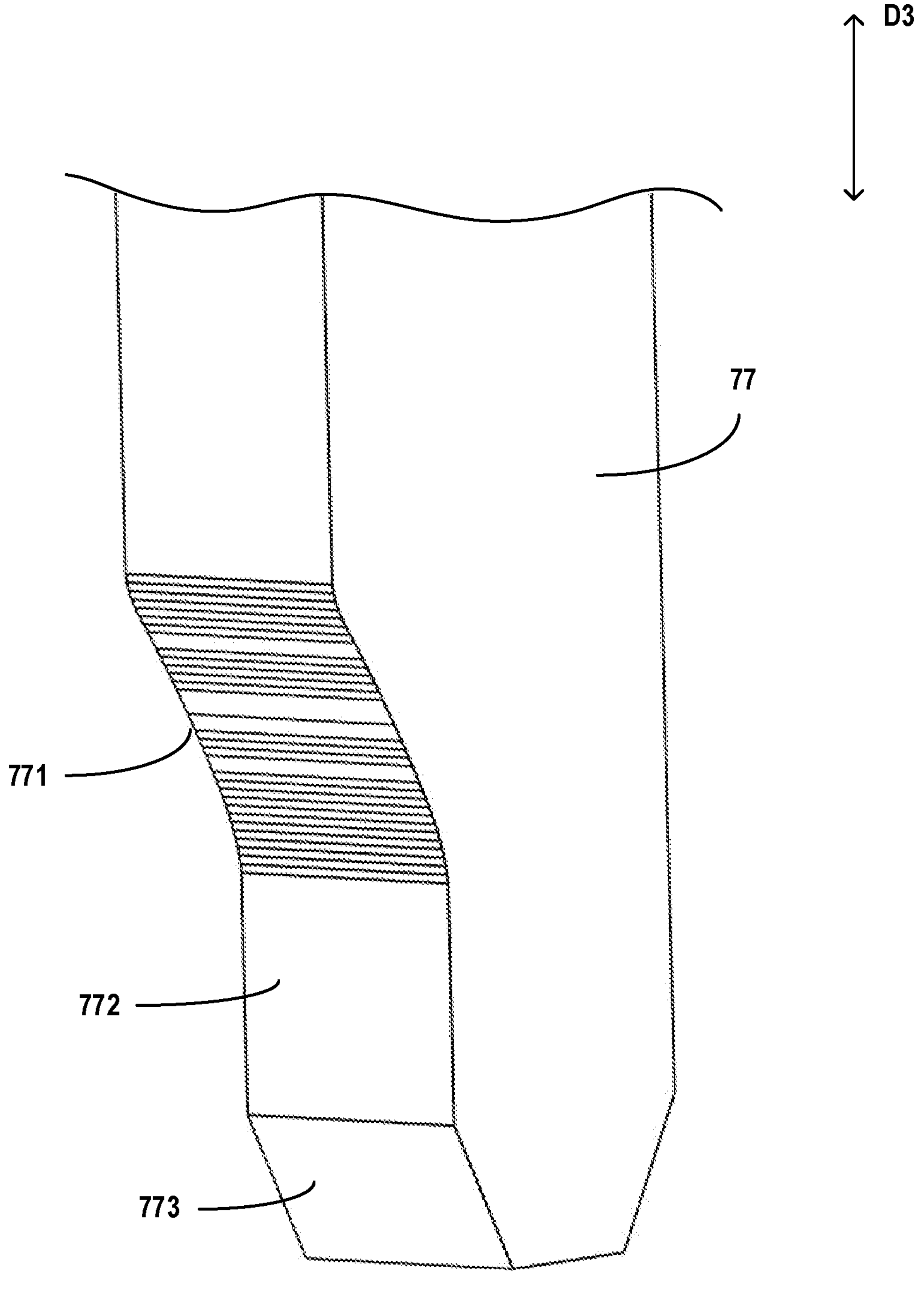
FIG. 4 is a schematic view of a separate driving rod in FIG. 1.

The involute face of the driving rod 77 corresponding to the shaping block 80 in FIGS. 2-3C is shown in FIG. 4. Referring to FIG. 4, the involute face includes a first inclined face 771, a straight wall face 772, and a second inclined face 773 from top to bottom, wherein the first inclined face 771 and the second inclined face 773 form an obtuse angle with a vertical line, and the straight wall face 772 is parallel to the vertical line. The first inclined face 771 transitions to the straight wall face 772 smoothly and has an extension length greater than that of the second inclined face 773. The first inclined face 771 is roughly parallel to the second inclined face 773. Moreover, a non-slip driving feature structure is disposed on the first inclined face 771, and includes, for example, a plurality of edges extending longitudinally and arranged along the vertical direction.

For example, for the shaping block 80 shown in FIGS. 2-3C, the included angle of the first inclined face 771 relative to the vertical line, the extension length of the first inclined face 771, and the like may be configured particularly to cause the first predetermined speed and the second predetermined speed to be specifically correlated, so that the pair of slide plates 50 approach each other at the first predetermined speed while the shaping block 80 moves downward at the second predetermined speed, thereby forming the blank plate by extrusion and obtaining the longitudinal corrugations and the intersection portion that correspond to the shape of the shaping block 80 shown in FIGS. 2-3C.

It should be noted that although the involute face in FIG. 4 corresponds to the shaping block 80 shown in FIGS. 2-3C, it can be understood that in actual industrial design, the shaping block 80 corresponding to the involute face in FIG. 4 is not exactly the same as the shaping block 80 in FIGS. 2-3C necessarily, and the involute face corresponding to the shaping block 80 in FIGS. 2-3C is not exactly the same as the involute face in FIG. 4 necessarily. Inspired by the implementations shown in FIGS. 2-4, a designer can design other possible configurations of the involute face and the shaping block that have a corresponding relationship, so that the pair of slide plates approach each other at the first predetermined speed while the shaping block moves downward at the second predetermined speed, and the desired longitudinal corrugations and intersection portion are obtained.

For example, it is known from multiple experiments in the present disclosure that an involute face including a first inclined face and a first straight wall face can correspond to an intersection portion shaping block having a smooth bottom surface and four drawbeads, and an overall extension direction of each of the drawbeads intersects a transverse direction, a longitudinal direction, and a vertical direction, as long as particular arrangements for an inclination angle and a length of the inclined face as well as other detailed arrangements for the shaping block fall within an reasonable range. The involute face including the first inclined face, the first straight wall face, and a second inclined face can correspond to such shaping block: an intersection portion includes a bottom surface and four drawbeads, the bottom surface has four smooth profile boundary lines successively connected between the four drawbeads, and all of the four profile boundary lines are recessed towards a center of the bottom surface at intermediate positions, as long as particular arrangements for inclined angles and lengths of the inclined faces as well as other detailed arrangements for the shaping block fall within a reasonable range.

In addition to the implementation shown in FIG. 4, the driving rod may have other involute faces. For example, an involute face may include a curved face recessed or protruding outward; an involute face may further include a curved face and a flat face that are disposed alternately; and an involute profile may include a plurality of curved faces with different radii of curvature. The process designer may correspondingly design the involute face of the driving rod according to the morphology of the shaping block.

In addition to the implementation shown in FIG. 1, the driving mechanism may also have other configurations to cause the first predetermined speed and the second predetermined speed to be specifically correlated with respect to a predetermined forming profile of the intersection portion. For example, the driving mechanism may be connected with the slide plates fixedly and/or connected with the shaping block in a manner of rolling or sliding friction; the driving mechanism itself may include a non-fixedly connected linkage mechanism, for example, the driving mechanism may include a first driving portion and a second driving portion having different movement directions and/or speeds, wherein the first driving portion may be connected with the slide plates, and the second driving portion may be connected with the shaping block; and the driving mechanism may include a control module which may be programmed to drive the shaping block to move downward at the second predetermined speed while driving the slide plates to approach each other at the first predetermined speed.

In some implementations, the longitudinal corrugations processed by the processing apparatus 500 are small corrugations, while the transverse corrugations are large corrugations, and both the height and width of the transverse corrugations are greater than those of the longitudinal corrugations. Correspondingly, both the width and height of the protrusion portions 76 of the press plates 60 are greater than the width and height of the longitudinal corrugation shaping block 81. In some implementations, cross-sectional profiles of the protrusion portions 76 of the press plates 60 are arced faces, a cross-sectional profile of the longitudinal corrugation shaping block 81 is also an arced face, and the corrugations processed by such device are called circular arc corrugations. In other implementations, cross-sectional profiles of the protrusion portions 76 of the press plates 60 may be roughly triangular, a cross-sectional profile of the longitudinal corrugation shaping block 81 may be also roughly triangular, and the corrugations processed by such device are called triangular corrugations.

In some other implementations, it may be also possible not to provide the intersection portion shaping block, as long as the involute face corresponds to the longitudinal corrugation shaping block. When the blank plate is formed by using the longitudinal corrugation shaping block, the intersection portion may be formed naturally at intersections of the transverse and longitudinal corrugations of the blank plate.

Figure 5:
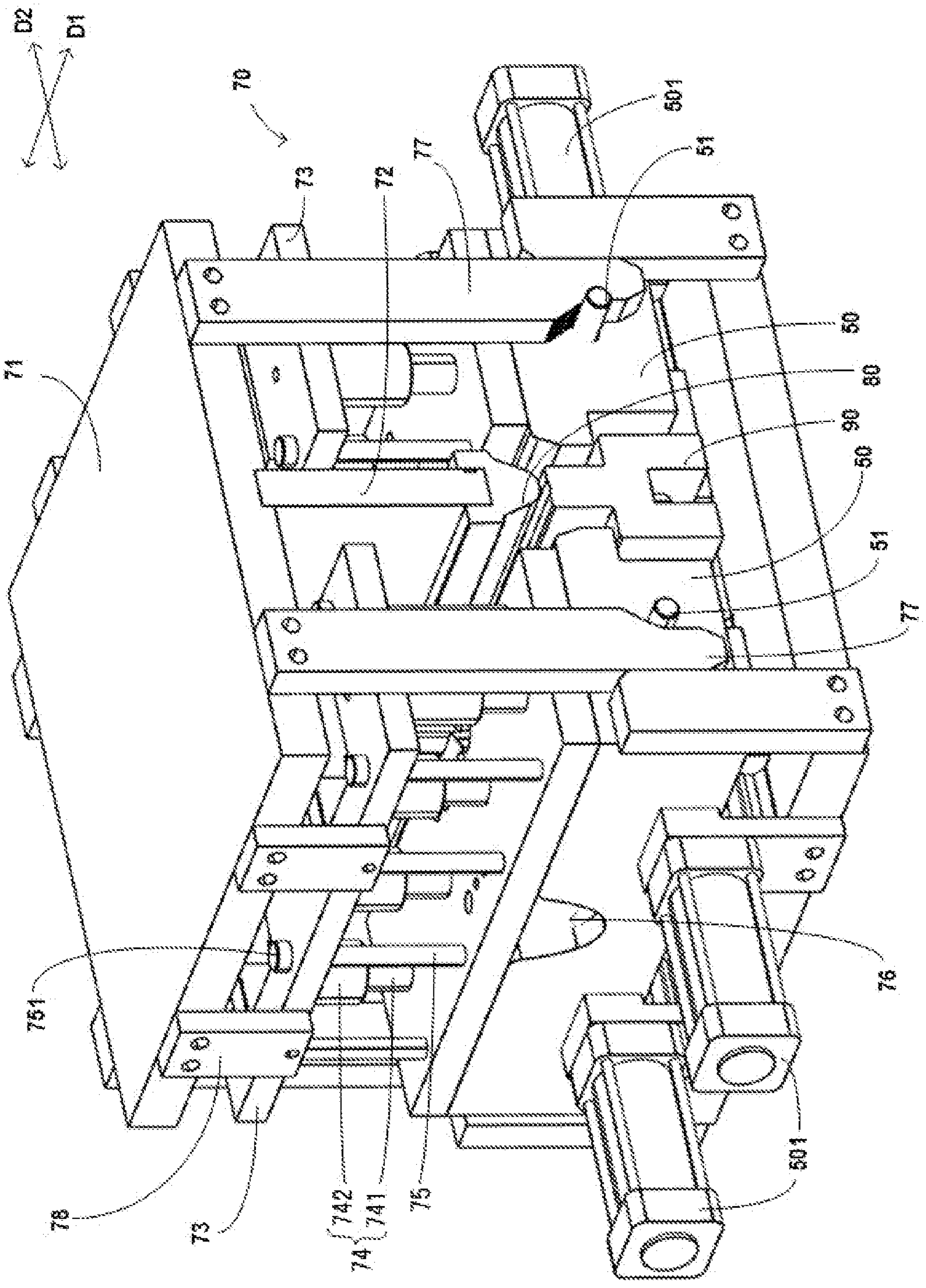
FIG. 5 is a schematic view of the processing apparatus in FIG. 1 in another operation state.
Figure 6:
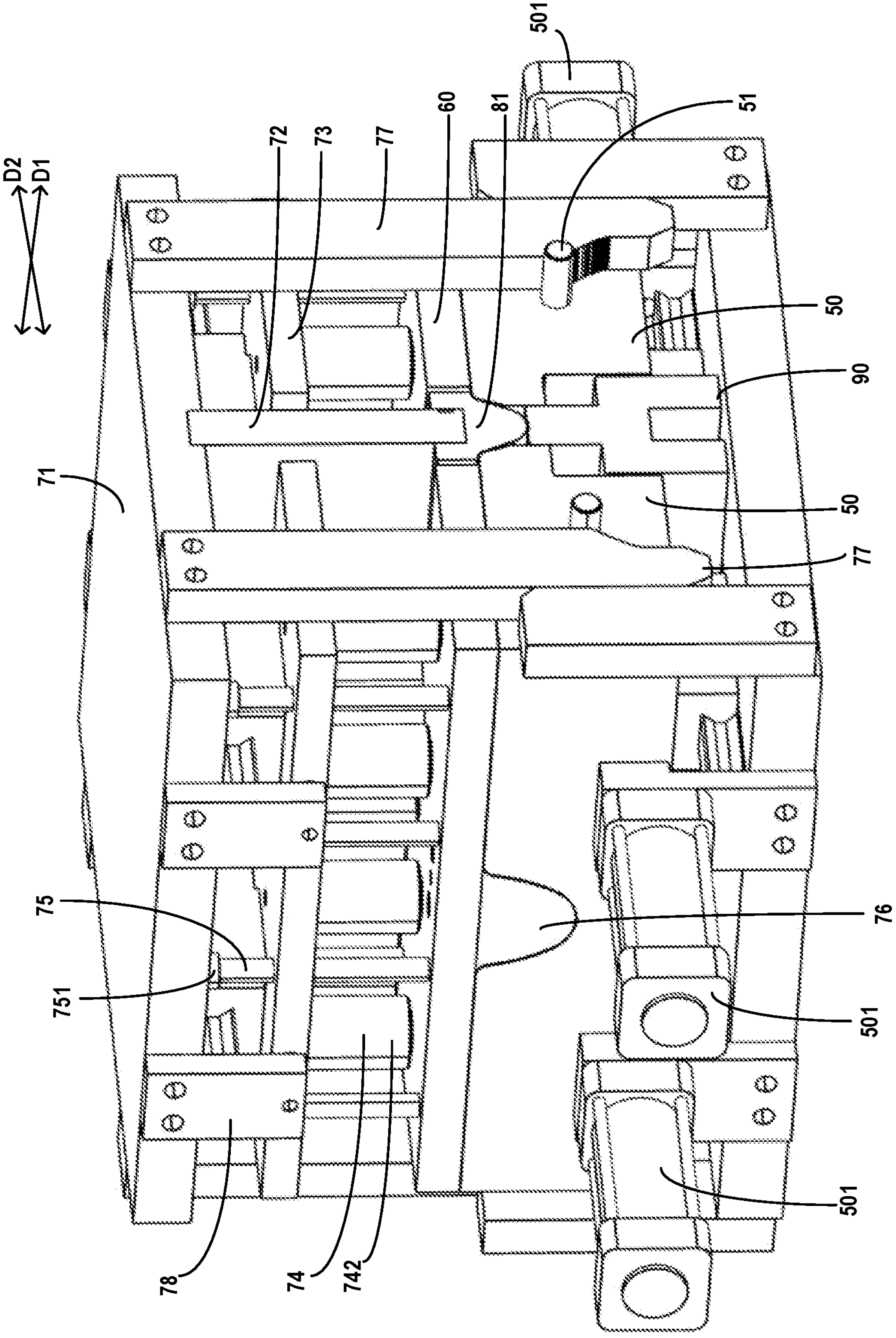
FIG. 6 is a schematic view of the processing apparatus in FIG. 1 in yet another operation state.

FIGS. 1, 5, and 6 show different working states of the processing apparatus 500 in some preferable implementations. An operation process of the processing apparatus 500 will be described below in conjunction with FIGS. 1, 5, and 6.

When it is necessary to use the processing apparatus 500 to produce the longitudinal corrugations and the intersection portion on the blank plate that already has transverse corrugations, the driving mechanism 70 may first be actuated so that the driving mechanism 70 may be moved upward to raise the press plates 60. In an implementation, in the first stage of the upward movement of the driving mechanism 70, the pressure source nitrogen gas springs 74 restore their original lengths, the guide connection limit rods 75 slide relative to the intermediate horizontal plates 73, the press plates 60 do not move, and the driving mechanism 70 moves upward relative to the press plates 60. In the second stage of the upward movement of the driving mechanism 70, the pressure source nitrogen gas springs 74 are at the longest tensile length, the limit portions 751 of the guide connection limit rods 75 are abutted against the top ends of the intermediate horizontal plates 73, the driving mechanism 70 drives the press plates 60 to move upward, and the press plates 60 move upward away from the slide plates 50. Moreover, it is also necessary, in this case, to actuate the air cylinders 501 to move the pair of slide plates 50 away from each other transversely. The state in this case is shown in FIG. 1. It can be seen from FIG. 1 that inner tubes 741 of the stretchable sleeves are exposed outside outer tubes 742.

Subsequently, the operator places the blank plate into a gap between the slide plates 50 and the press plates 60 and causes the transverse corrugations of the blank plate to be exactly located within the accommodating regions 52 and to be pressed by the protrusion portions 76 correspondingly in shape. Subsequently, the driving mechanism 70 is actuated so that the driving mechanism 70 is moved downward. In the first stage of the downward movement of the driving mechanism 70, the pressure source nitrogen gas springs 74 are at the maximum elongation length, the limit portions 751 of the guide connection limit rods 75 are abutted against the top sides of the intermediate horizontal plates 73, and the press plates 60 move downward along with the driving mechanism 70, until the press plates 60 are abutted against the top sides of the slide plates 50. The state in this case is shown in FIG. 5. It can be seen from FIG. 5 that the inner tubes 741 of the stretchable sleeves are exposed outside the outer tubes 742.

Subsequently, the driving mechanism 70 continues to move downward, and this stage is the second stage of the downward movement of the driving mechanism 70. In the second stage of the downward movement of the driving mechanism 70, the pressure source nitrogen gas springs 74 are compressed, the guide connection limit rods 75 penetrate through the intermediate horizontal plates 73 so as to slide relative to the intermediate horizontal plates 73, and the driving mechanism 70 cannot actuate the press plates 60 downward. The second stage of the downward movement of the driving mechanism 70 is mainly used to actuate the shaping block 80 and the slide plates 50.

In the second stage of the downward movement of the driving mechanism 70, the shaping block 80, which is installed at the bottom end of the vertical plate 72 of the driving mechanism 70 fixedly, moves downward at a uniform second predetermined speed along with the driving mechanism 70 while the involute faces of the driving rods 77 of the driving mechanism 70 contact and push the force pins 51 of the slide plates 50. The shapes of the involute faces are designed such that when the driving mechanism 70 moves downward at the second predetermined speed, the pair of slide plates 50 approach each other at a non-uniform first predetermined speed. The second predetermined speed and the first predetermined speed are specifically correlated. "Specifically correlated" means that an association relationship between the second predetermined speed and the first predetermined speed is set specifically for the particular morphology of the shaping block 80. In the second stage of the downward movement of the driving mechanism 70, the shaping base 90, the shaping block 80, and the pair of slide plates 50 jointly extrude the blank plate to obtain the predetermined longitudinal corrugations and intersection portion. Running speeds of various portions that move in different directions to extrude the blank plate are specifically associated, so that the formation process is particularly applicable to the corrugated plate having the predetermined corrugated shape.

The state at the end of the second stage of the downward movement of the driving mechanism 70 is shown in FIG. 6. In this case, the pair of slide plates 50 are located closest relative to each other, and the shaping block 80 is pressed against between the pair of slide plates 50 and pressed against a top side of the shaping base 90. In this case, the pressure source nitrogen gas springs 74 are at a position where they are shortest, and it can be seen that the inner tubes are completely accommodated within the outer tubes 742. In this case, the limit portions 751 of the guide connection limit rods 75 are abutted against the bottom side of the main horizontal plate 71.

Thereafter, the operator may actuate the driving mechanism 70 again to move it upward again while driving the air cylinders 501 to make the pair of slide plates 50 away from each other, so that the processing apparatus 500 is restored to the state shown in FIG. 1 to facilitate the operator taking out the finished corrugated plate.

It can be known in conjunction with the above implementations that the driving mechanism of the processing apparatus of the present disclosure is uniquely configured for a predetermined formed corrugated shape to particularly cause the running speeds of various portions that move in different directions to extrude the blank plate to be specifically associated, so that the formation process is particularly applicable to the corrugated plate having the predetermined corrugated shape. The corrugated plate manufactured in such process will have better material uniformity, fluency, and strength at its formed corrugations, particularly at intersections of transverse and longitudinal corrugations.

The present disclosure further provides a corrugated plate obtained by processing with the processing apparatus of the above implementations, and a storage container having the corrugated plate. The storage container includes, for example, a liquefied gas storage tank for particularly marine equipment such as ships. Liquefied gases include, for example, liquefied natural gas, liquid nitrogen, liquid oxygen, liquid hydrogen, and liquid helium, etc.

The above description of various implementations of the present disclosure is provided for the purpose of description to a person of ordinary skill in the relevant art. It is not intended to make the present disclosure exclusive or limitative to a single disclosed implementation. As above, a person of ordinary skill in the art as taught above will understand various substitutions and variations of the present disclosure. Therefore, although some alternative implementations are described in detail, a person of ordinary skill in the art will understand or relatively easily develop other implementations. The present disclosure is intended to include all substitutions, modifications, and variations of the present disclosure as described herein, as well as other implementations falling within the spirit and scope of the present disclosure as described above.

What is claimed is:

1. A processing apparatus for a corrugated plate of a liquefied gas storage tank for marine engineering equipment, the corrugated plate having longitudinal corrugations and transverse corrugations that have an intersection portion, wherein the processing apparatus comprises:

a pair of slide plates movable away from and close to each other along a transverse direction;

a pair of press plates correspondingly located on top sides of the pair of slide plates to press a blank plate between the pair of slide plates and the pair of press plates tightly;

a shaping block located between the pair of slide plates, a bottom end of the shaping block having a predetermined forming profile with a transverse size gradually reduced towards a bottom side; and a driving mechanism comprising:

a slide plate driving portion in contact with the pair of slide plates; and a shaping block driving portion connected with the shaping block, wherein the shaping block driving portion and the slide plate driving portion are fixed relative to each other, so that the slide plate driving portion drives the pair of slide plates to approach each other at a first predetermined speed, the shaping block driving portion drives the shaping block to move downward at a second predetermined speed, and the first predetermined speed and the second predetermined speed are specifically correlated with respect to a predetermined forming profile of the intersection portion, wherein the first predetermined speed is a non-uniform speed, and the second predetermined speed is a uniform speed, wherein the shaping block comprises a longitudinal corrugation shaping block extending along a longitudinal direction and an intersection portion shaping block located at a center of the longitudinal corrugation shaping block longitudinally, only a transverse size of the longitudinal corrugation shaping block is gradually reduced in a direction towards the bottom side, and both a transverse size and a longitudinal size of the intersection portion shaping block are gradually reduced in the direction towards the bottom side, wherein a diversion core having a predetermined punch shape is installed on the intersection portion shaping block, and a hardness of the diversion core is greater than that of other portions of the shaping block;

wherein the pair of slide plates each has a force pin protruding longitudinally and having a smooth external profile, an involute face for getting contact with the force pins is formed on the slide plate driving portion, and the involute face is designed to cause the first predetermined speed and the second predetermined speed to be specifically correlated; and wherein the involute face comprises a first inclined face, a straight wall face, and a second inclined face from top to bottom, wherein the first inclined face and the second inclined face form an obtuse angle with a vertical line, and the straight wall face is parallel to the vertical line.

2. The processing apparatus of claim 1, wherein the first inclined face transitions to the straight wall face smoothly and has an extension length greater than that of the second inclined face, and a non-slip driving feature structure is disposed on the first inclined face, wherein an included angle of the first inclined face relative to the straight wall face and the extension length of the first inclined face are designed to cause the first predetermined speed and the second predetermined speed to be specifically correlated.

3. The processing apparatus of claim 1, wherein the driving mechanism comprises a main horizontal plate and a vertical plate that are connected in one piece, and the vertical plate extends downward from a center of the main horizontal plate in the transverse direction, wherein the slide plate driving portion comprises driving rods, tops of which are fixed on the main horizontal plate; and the shaping block is fixed at a bottom end of the vertical plate.

4. The processing apparatus of claim 1, wherein a connection mechanism is disposed between the driving mechanism and the pair of press plates, and the connection mechanism is constructed to allow not only the pair of press plates to move vertically together with the driving mechanism, but also the driving mechanism to move vertically relative to the pair of press plates when the pair of press plates are abutted against the top side of the pair of slide plates.

5. The processing apparatus of claim 4, wherein the driving mechanism comprises a main horizontal plate, the connection mechanism comprises pressure source nitrogen gas springs disposed between the main horizontal plate and the pair of press plates, and the pressure source nitrogen gas springs are constructed to be able to provide pressure to the pair of press plates, and to be locked when the pressure source nitrogen gas springs are at a maximum tensile length so as to allow the pair of press plates to move vertically together with the main horizontal plate.

6. The processing apparatus of claim 5, wherein the driving mechanism further comprises intermediate horizontal plates connected with the main horizontal plate fixedly and located below the main horizontal plate, top ends of the pressure source nitrogen gas springs are fixed on the intermediate horizontal plates, and bottom ends of the pressure source nitrogen gas springs are fixed on the pair of press plates, and wherein the connection mechanism further comprises guide connection limit rods, bottom ends of the guide connection limit rods are fixed on the press plates, the guide connection limit rods penetrate through the intermediate horizontal plates movably, and top ends of the guide connection limit rods are provided with limit portions that can be abutted against top sides of the intermediate horizontal plates.

7. The processing apparatus of claim 6, wherein the top ends of the guide connection limit rods are abutted against a bottom side of the main horizontal plate when the pressure source nitrogen gas springs are at a minimum tensile length.

8. The processing apparatus of claim 1, wherein the processing apparatus further comprises a shaping base, which is located below the shaping block and a top surface of which has a forming profile recessed downward, and the shaping base moves together when the shaping block moves downward.

9. A processing apparatus for a corrugated plate of a liquefied gas storage tank for marine engineering equipment, the corrugated plate having longitudinal corrugations and transverse corrugations that have an intersection portion, wherein the processing apparatus comprises:

a pair of slide plates movable away from and close to each other along a transverse direction;

a pair of press plates correspondingly located on top sides of the pair of slide plates to press a blank plate between the pair of slide plates and the pair of press plates tightly;

a shaping block located between the pair of slide plates, a bottom end of the shaping block having a predetermined forming profile with a transverse size gradually reduced towards a bottom side; and a driving mechanism comprising:

a slide plate driving portion in contact with the pair of slide plates; and a shaping block driving portion connected with the shaping block, wherein the shaping block driving portion and the slide plate driving portion are fixed relative to each other, so that the slide plate driving portion drives the pair of slide plates to approach each other at a first predetermined speed, the shaping block driving portion drives the shaping block to move downward at a second predetermined speed, and the first predetermined speed and the second predetermined speed are specifically correlated with respect to a predetermined forming profile of the intersection portion, wherein the first predetermined speed is a non-uniform speed, and the second predetermined speed is a uniform speed, wherein the shaping block comprises a longitudinal corrugation shaping block extending along a longitudinal direction and an intersection portion shaping block located at a center of the longitudinal corrugation shaping block longitudinally, only a transverse size of the longitudinal corrugation shaping block is gradually reduced in a direction towards the bottom side, and both a transverse size and a longitudinal size of the intersection portion shaping block are gradually reduced in the direction towards the bottom side, wherein a diversion core having a predetermined punch shape is installed on the intersection portion shaping block, and a hardness of the diversion core is greater than that of other portions of the shaping block;

wherein the intersection portion shaping block comprises a smooth bottom surface having four corners that are symmetrical pairwise both longitudinally and transversely, and the intersection portion shaping block further comprises four drawbeads extending upward from the four corners respectively, wherein an overall extension direction of each of the drawbeads intersects all of the transverse direction, the longitudinal direction, and a vertical direction.

10. The processing apparatus of claim 9, wherein the bottom surface has four smooth profile boundary lines successively connected between the four drawbeads, and all of the four profile boundary lines are recessed towards a center of the bottom surface at their respective intermediate positions.

11. The processing apparatus of claim 10, wherein among the four profile boundary lines, two profile boundary lines located at both ends of the bottom surface longitudinally have a recessed first radius of curvature, and two profile boundary lines located at both ends of the bottom surface transversely have a recessed second radius of curvature, wherein the first radius of curvature is greater than or equal to the second radius of curvature.

12. The processing apparatus of claim 10, wherein a longitudinal size of the bottom surface is less than its transverse size.

13. The processing apparatus of claim 9, wherein the bottom surface transitions to the drawbeads smoothly, and an included angle between any position of the bottom surface and a horizontal plane is less than an included angle between the overall extension direction of the drawbeads and the horizontal plane.

14. The processing apparatus of claim 9, wherein in a direction from a position where each of the drawbeads is connected with the bottom surface to a tail end away from the bottom surface, a thickness of the drawbead gradually decreases.

15. The processing apparatus of claim 9, wherein in a bottom view of the intersection portion shaping block, a main body portion of each of the drawbeads extends along a direction that intersects both the longitudinal direction and the transverse direction, the tail end of each of the drawbeads extends along the transverse direction, and the main body portion transitions to the tail end smoothly.

16. The processing apparatus of claim 12, wherein a bottommost end of a projection of the intersection portion shaping block within a projection plane defined by the vertical direction and the transverse direction is a curved face, and a bottommost end of a projection within a projection plane defined by the vertical direction and the longitudinal direction is a horizontal straight line segment.

* * * * *